(12) United States Patent
Parkins

(10) Patent No.: US 8,800,786 B2
(45) Date of Patent: Aug. 12, 2014

(54) PORTABLE BICYCLE STAND

(76) Inventor: Howard Parkins, Burbank, CA (US)

( * ) Notice: Subject to any disclaimer, the term of this patent is extended or adjusted under 35 U.S.C. 154(b) by 229 days.

(21) Appl. No.: 13/324,292

(22) Filed: Dec. 13, 2011

(65) Prior Publication Data

US 2013/0146484 A1     Jun. 13, 2013

(51) Int. Cl.
| | |
|---|---|
| A47F 7/00 | (2006.01) |
| A47B 43/00 | (2006.01) |
| A47B 47/00 | (2006.01) |
| A47B 57/00 | (2006.01) |
| B62H 3/08 | (2006.01) |
| B60R 9/10 | (2006.01) |

(52) U.S. Cl.
CPC .. *B62H 3/08* (2013.01); *B60R 9/10* (2013.01); *A47B 43/00* (2013.01)
USPC ............................................. 211/20; 211/195

(58) Field of Classification Search
USPC ......... 211/23, 24, 17, 20, 22, 42, 43, 74, 175, 211/195; 224/924, 547, 549, 571; 410/3; D12/115; 206/216, 304; 248/127, 146, 248/346.01, 346.03, 188.8, 188.7, 677; 361/679.59, 724; 312/223.2
See application file for complete search history.

(56) References Cited

U.S. PATENT DOCUMENTS

| | | | |
|---|---|---|---|
| 342,187 A * | 5/1886 | Cornell .......................... 269/133 |
| 446,835 A * | 2/1891 | Kennedy ......................... 211/20 |
| 529,939 A * | 11/1894 | Noderer ........................... 211/20 |
| D58,504 S * | 7/1921 | Rancel ........................... D6/466 |
| 2,397,766 A * | 4/1946 | Tullis ................................ 126/38 |
| 3,116,836 A * | 1/1964 | McCauley ....................... 211/21 |
| 3,208,314 A * | 9/1965 | Locke ............................. 81/436 |
| 3,785,517 A * | 1/1974 | Brajkovich .................... 414/462 |
| 4,106,735 A * | 8/1978 | Partain et al. ................... 410/49 |
| 4,193,233 A * | 3/1980 | VandenHoek et al. ....... 52/126.4 |
| 4,394,563 A * | 7/1983 | Schnell .......................... 392/373 |
| 4,442,961 A * | 4/1984 | Bott ............................... 224/570 |
| 4,449,969 A * | 5/1984 | Schweizer ..................... 604/322 |
| 4,502,656 A * | 3/1985 | Zeitler ...................... 248/346.03 |
| 4,505,408 A * | 3/1985 | Sagol .......................... 222/185.1 |
| 4,635,811 A * | 1/1987 | Lodi ............................... 220/629 |
| 4,802,594 A * | 2/1989 | Graber ............................ 211/20 |
| 4,955,873 A * | 9/1990 | Rajlevsky ..................... 604/322 |
| 5,388,792 A * | 2/1995 | Hastings et al. ........... 248/188.1 |
| 5,601,541 A * | 2/1997 | Swisher ......................... 604/322 |
| 5,749,637 A * | 5/1998 | McMahan et al. ......... 312/223.2 |
| 5,875,912 A * | 3/1999 | Hobson ........................ 220/4.03 |
| 5,887,962 A * | 3/1999 | Tsai ............................ 312/351.9 |
| 6,062,396 A * | 5/2000 | Eason ............................. 211/20 |
| 6,336,562 B1 * | 1/2002 | Mori .............................. 211/20 |
| 6,364,269 B1 * | 4/2002 | Hofer ....................... 248/346.01 |
| 6,581,785 B1 * | 6/2003 | Falkenstein .................... 211/24 |
| 6,755,309 B1 * | 6/2004 | Runge ............................. 211/20 |

(Continued)

*Primary Examiner* — Jennifer E Novosad

(74) *Attorney, Agent, or Firm* — James A. Italia; Italia IP

(57) ABSTRACT

A stand for a bicycle having a wheel, which stand holds the bicycle in an upright position of use on a horizontal surface. The stand comprises a trough having an upwardly open receptacle which is dimensioned and configured to receive the wheel in close cooperation therewith. One or more feet may be manually coupled to the trough to project laterally therefrom to steady the trough on the horizontal surface. The feet may slide fit to the trough, fasten by threaded fasteners, or may fold for stowage within the trough and swing out into a deployed position. The trough may include a storage compartment for bicycle tools and repair materials.

3 Claims, 6 Drawing Sheets

(56) References Cited

U.S. PATENT DOCUMENTS

| | | | |
|---|---|---|---|
| 6,866,282 B2* | 3/2005 | Heerspink | 280/296 |
| 7,028,850 B1* | 4/2006 | Sargisian | 211/22 |
| 7,051,909 B2* | 5/2006 | Gibson | 224/403 |
| 7,114,694 B2* | 10/2006 | Li | 248/677 |
| 7,273,197 B1* | 9/2007 | Huggins et al. | 248/154 |
| 7,328,880 B2* | 2/2008 | Helot et al. | 248/346.01 |
| 7,448,587 B2* | 11/2008 | Han | 248/346.07 |
| 7,690,516 B1* | 4/2010 | Crump | 211/19 |
| 7,966,950 B2* | 6/2011 | Volpe et al. | 108/44 |
| 8,042,783 B2* | 10/2011 | Santoro | 248/346.03 |
| 8,096,517 B1* | 1/2012 | Hamilton | 248/308 |
| 2004/0084491 A1* | 5/2004 | Gibson | 224/403 |
| 2005/0061842 A1* | 3/2005 | Tsai | 224/501 |
| 2005/0284826 A1* | 12/2005 | Johnson | 211/20 |
| 2006/0273125 A1* | 12/2006 | Bogoslofski et al. | 224/509 |
| 2007/0138112 A1* | 6/2007 | Meyer et al. | 211/24 |
| 2008/0135713 A1* | 6/2008 | Santoro | 248/346.03 |
| 2011/0204199 A1* | 8/2011 | Sekino | 248/346.04 |

* cited by examiner

US 8,800,786 B2

PORTABLE BICYCLE STAND

FIELD OF THE INVENTION

The present invention relates to stands for supporting bicycles in an upright position on a flat horizontal surface.

BACKGROUND OF THE INVENTION

Bicycles must frequently be transported from one location to another, and when not in use, appropriately supported so that they do not lie on the horizontal surface, or fall down. Also, it may be desirable to support a bicycle in an upright position of use without requiring hand grip, as may for example be necessary for repair and maintenance work.

Bicycles are frequently provided with so-called kick stands, which typically comprise a prop leg which is mounted on the bicycle and can be swung between a stowed postion and a deployed position. Racks have been proposed for supporting groups of bicycles en masse in public places. While these devices generally serve their purposes, it is desirable to better support bicycles, which may be quite expensive. Because an owner of a bicycle cannot depend on a suitable bicycle stand or rack being available when and where the owner may want, it is desirable to provide a suitable stand or support which is portable, compact, and which securely holds a bicycle.

SUMMARY OF THE INVENTION

The present invention provides a secure, compact stand for bicycles which supports the bicycle in the upright position. The stand rests directly on a suitable flat horizontal surface, such as the ground or the floor of a building. The stand may be ganged to support a group of bicycles.

The novel stand comprises a trough configured to receive the wheel of a bicycle in close cooperation therewith. Preferably, the trough is configured to receive a wheel having an inflated tire installed thereon, although the trough may be configured to receive a wheel in the absence of a tire if desired. For brevity, the present invention will refer to wheels of bicycles with the understanding that the wheel may or may not have a tire installed thereon. The trough is provided with feet to assure that the bicycle be retained therein and oppose spontaneous tumbling of the bicycle from the supported position. The feet may be manually detachable and installed.

According to one implementation of the invention, a trough may be provided in a size accommodating a relatively large tire. Adapting liners may be provided which may be manually inserted into and removed from the receptacle of the trough, which adapating liners may have the effect of reducing the receptacle so as to cooperate closely with a wheel of dimensions less than that of the large tire.

It is an object of the invention to provide a self-supporting stand for holding a bicycle in an upright position.

Another object of the invention is that the stand be compact for stowage and transport.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1A:
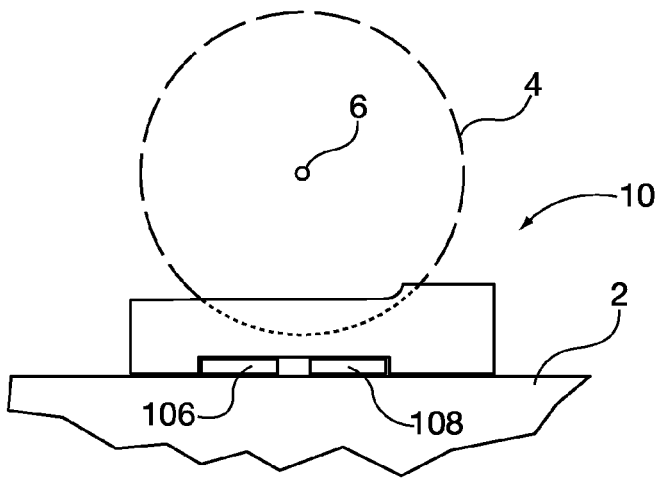
FIG. 1A is a side view of a bicycle wheel held within a stand according to at least one aspect of the invention.

Referring first to FIG. 1A, according to at least one aspect of the invention, a stand 100 is shown supported on a horizontal surface 2, for the purpose of holding a first wheel 4 mounted on a bicycle (not shown in its entirety) in an upright position when the bicycle is not in use. It should be noted at this point that orientational terms such as upright refer to the subject drawing as viewed by an observer. The drawing figures depict their subject matter in orientations of normal use, which could obviously change with changes in posture and position of a user or a bicycle. Therefore, orientational terms must be understood to provide semantic basis for purposes of description, and do not limit the invention or its component parts in any particular way.

Figure 2:
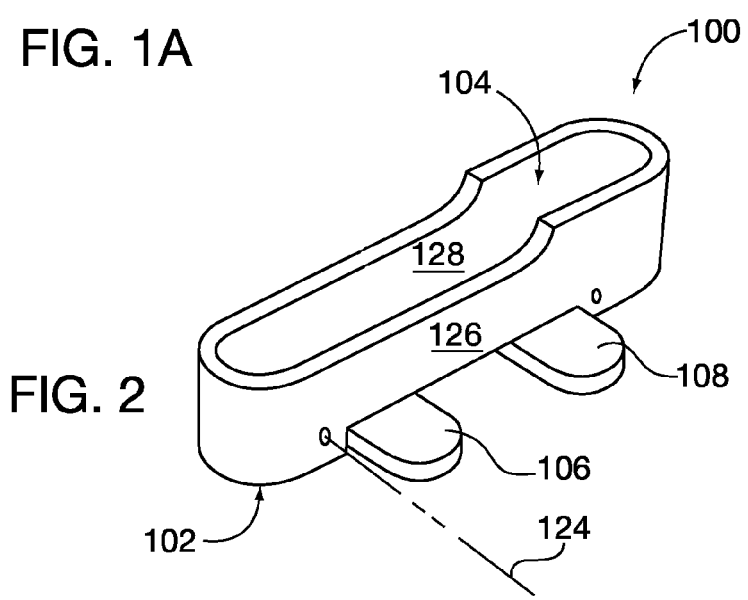
FIG. 2 is a perspective view of the stand of FIG. 1.

The nature of the stand 100 is better understood when examining FIG. 2. The stand 100 is seen to comprise a trough 102 defining a primary receptacle 104. The primary receptacle 104 is upwardly open, and is preferably dimensioned and configured to receive the wheel 4 by lowering the wheel 4 into the primary receptacle 104 from above when the stand 100 is in the position of use depicted in FIG. 1A.

The stand comprises a plurality of stabilizing feet 106, 108 each of which is manually movable to a stowed position and a deployed position relative to the trough 102. The deployed position is illustrated in FIGS. 1A and 2. In the deployed position, each stabilizing foot 106 or 108 is fixed to and projects laterally from the trough 102 in a direction generally parallel to the axle 6 of the first wheel 4, as shown in FIGS. 1A and 2.

In the implementation of FIG. 2, the feet 106, 108 are each part of two folding foot assemblies represented by the folding foot assembly 110, which enable each foot 106 or 108 to fold into and be stowed within the primary receptacle 104 of the trough 102.

Figure 3:
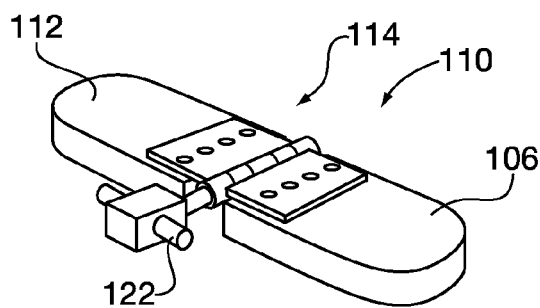
FIG. 3 is a perspective view of a component of the stand of FIG. 2.
Figure 4:
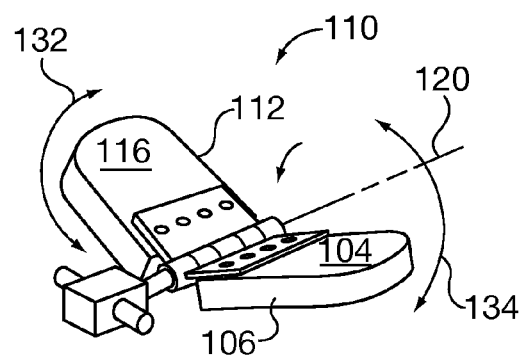
FIG. 4 is a perspective view of the component of FIG. 3, showing an early stage of folding for stowage.
Figure 5:
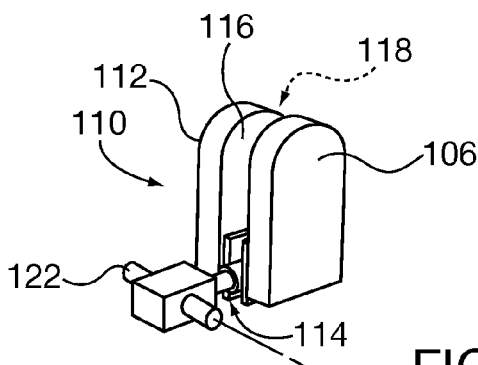
FIG. 5 is a perspective view of the component of FIG. 4, showing a final stage of folding for stowage.

The nature of the folding foot assembly 110 is explained with reference to FIGS. 3-6. FIG. 2 shows the folding foot assemblies in the deployed position, wherein the feet 106, 108 project laterally from the trough 102 so as to stabilize the stand 100 against spontaneous tumbling or falling of bicycles from the position they would assume with a wheel supported as seen in FIG. 1A. The folding foot assembly 110 may comprise two feet 106, 112 held together by a hinge 114. The larges faces 116, 118 of the respective feet 106, 112 are held facing one another in close proximity in the stowed position depicted in FIGS. 5 and 6, and to fold open to occupy a common plane, as seen in FIG. 3. FIG. 4 depicts an intermediate stage of folding, wherein the feet 106, 112 pivot about the axis 120 of the hinge 114. The folding foot assembly 110 further comprises an axle 122 pivotally mounted to the trough 102. The axle 122 is disposed to pivot about its pivot axis 124 between the stowed position shown in FIG. 6, wherein the feet 106, 112 are contained at least partially within the primary receptacle 104 of the trough 102, and the deployed position of FIGS. 2 and 3, wherein the feet 106, 112 are external to the trough 102.

Figure 6:
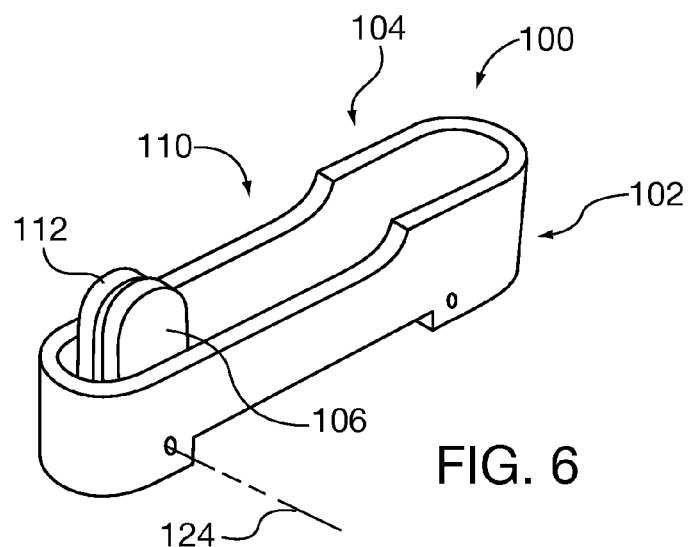
FIG. 6 is a perspective view of the stand of FIG. 2, with the component shown fully folded and in a stowage position.

In summary, the feet 106, 112 may be moved from the stowed position seen in FIG. 6 to the deployed position of FIGS. 2 and 3 in the following way. First, the feet 106, 112 may be swung downwardly from their position partially occupying the receptacle 104, as seen in FIG. 6, by pivoting the feet 106, 112 about the axis 124 of the axle 122. Pivoting motion is indicated in FIG. 2 by an arrow 130. Once free of constraint due to the outer walls 126, 128 of the trough 102, the feet 106, 112 may be swung out of the parallel position seen in FIG. 5 to a spread position seen in FIG. 3. FIG. 4 shows an intermediate position of pivot, with each foot 106 or 112 being pivoted as indicated by respective arrows 132, 134. Once the feet 106, 112 are fully spread apart as seen in FIG. 3, they may be simultaneously pivoted upwardly about the axis 124 until their respective large faces 116, 118 contact the bottom of the trough 102, as seen in FIG. 2. The stand 100 is now stabilized.

Figure 1B:
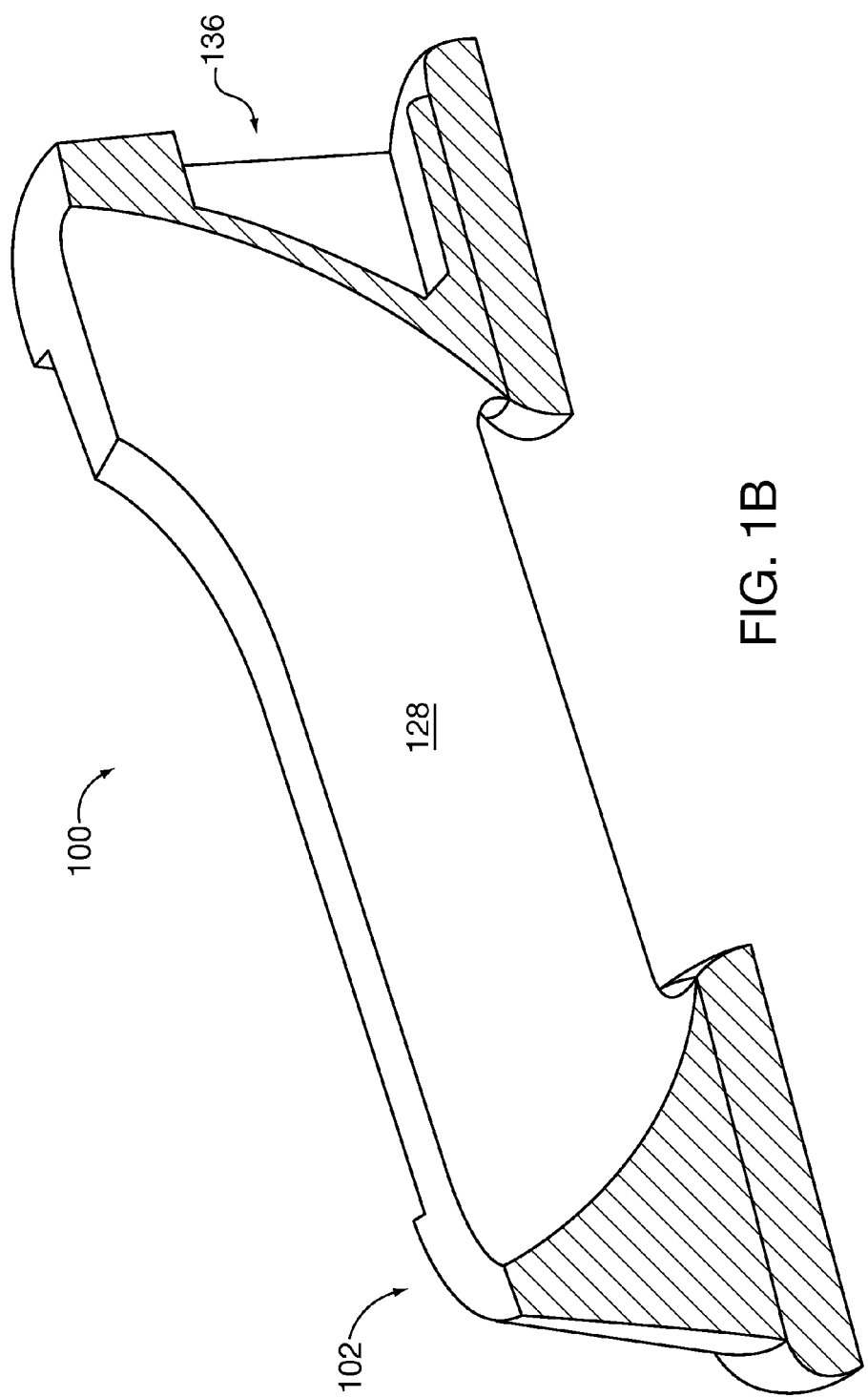
FIG. 1B is an enlarged perspective view showing the stand of FIG. 1 in cross section.

Any stand according to the present invention may comprise a storage compartment 136, which for purposes of illustration may be formed in the trough 102 of the stand 100. That portion of the trough 102 to the right of the bottom of the receptacle 104 may be hollow to define the storage compartment 136. The storage compartment 136 may open to the exterior of the trough 102 without communicating with the receptacle 104, and thus provides a storage space which avoids intruding upon the primary receptacle 104 of the trough 102. The storage compartment is also seen in FIG. 1B.

Figure 8:
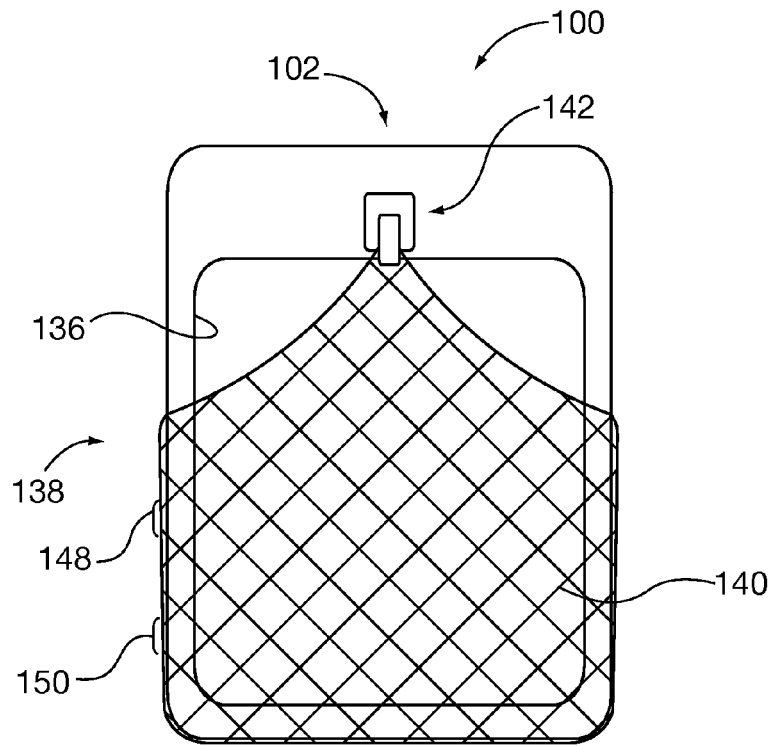
FIG. 8 is an end view of the right side of FIG. 1.

Referring also to FIG. 8, the storage compartment 136 may comprise an openable closure 138, which openable closure may take the form of a flexible web 140 which removably engages the trough 102. The trough 102 may comprise a hook 142 disposed on the trough 102 in a location wherein the openable closure 138 may engage and be retained to the hook. Engagement is seen in FIG. 8.

Figure 7:
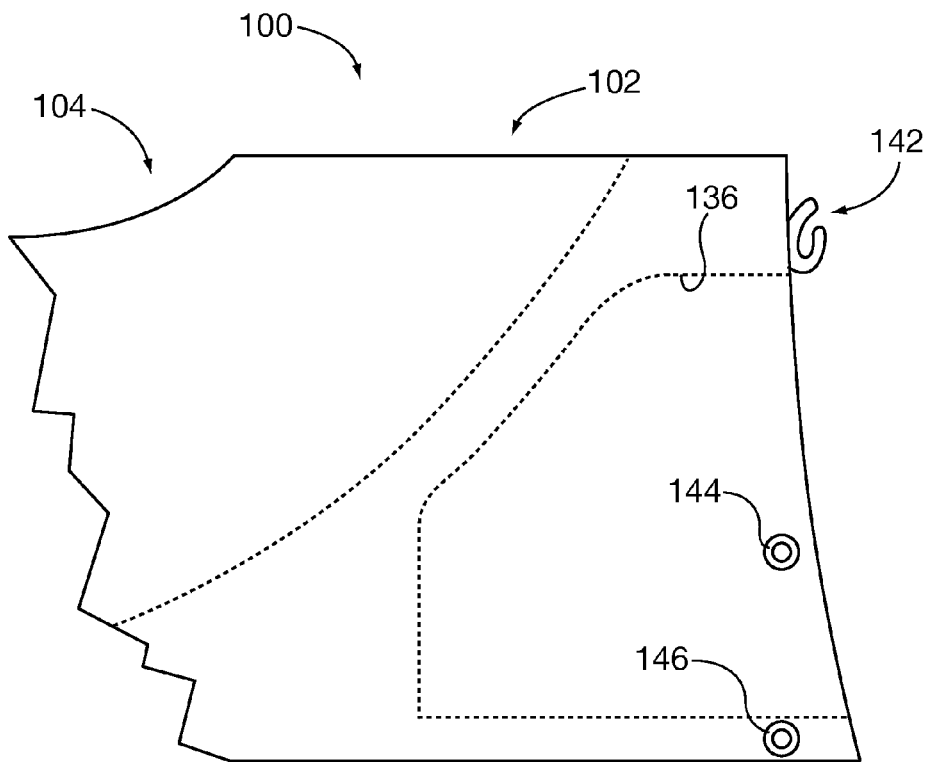
FIG. 7 is an enlarged side detail view of the right side of FIG. 1.

The trough 102 may be provided with a plurality of snap fasteners 144, 146 on the sides thereof, as seen in FIG. 7, to engage and retain the openable closure 138. The web 140 may be drawn tightly over the end of the trough 102 so that it slightly overlaps the sides of the trough 102. Complementing snap fasteners 148, 150 may be snap fit to the snap fasteners 144, 146 when appropriately overlying the same. The snap fasteners 144, 146, 148, 150 are shown on one side of the trough 102. A similar arrangement (not shown) may be provided in mirror image orientation on the opposing side of the trough 102 if desired.

Figure 9:
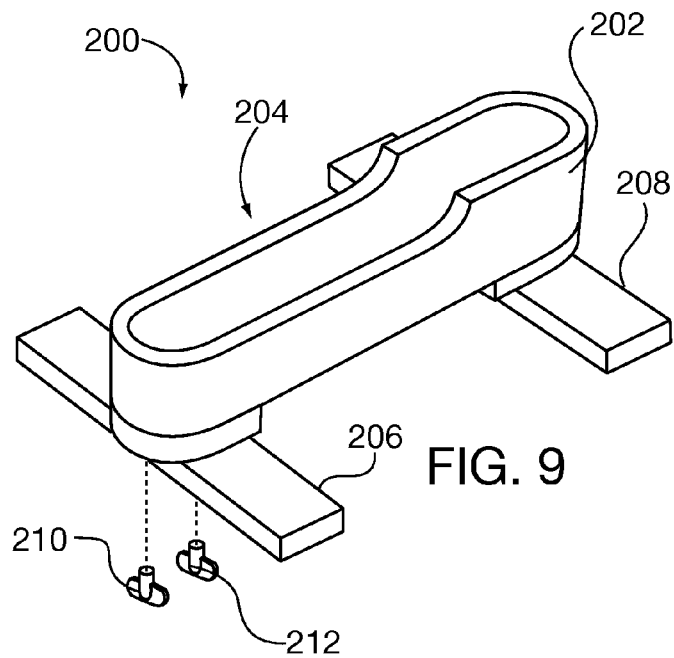
FIG. 9 is a perspective view of another stand for a bicycle, according to at least one further aspect of the invention.

FIG. 9 shows an alternative to the folding feet 106, 112 of FIGS. 1A and 2. In FIG. 9, a stand 200 may comprise a trough 202 defining a primary receptacle 104. The primary receptacle 204 is upwardly open, and is preferably dimensioned and configured to receive the wheel 4 by lowering the wheel 4 into the primary receptacle 204 from above when the stand 200 is in a the position of use such as that depicted in FIG. 1A. The stand 200 may have feet 206, 208 each secured to the trough 202 by a threaded fastener arrangement disposed to hold the stabilizing feet 206, 208 in a deployed position such as that shown in FIGS. 1A and 2. The threaded fastener arrangement may include threaded fasteners such as wing nuts 210, 212. The foot 208 may be similarly provided as the foot 206. Preferably, the trough 202 is provided with threaded holes (not shown) corresponding to the threading of the shafts of the wing nuts 210, 212. Also, the feet 206, 208 may bear preformed holes (not shown) to pass the shafts of the wing nuts 210, 212. The wing nuts 210,212 may be manually tightened and loosened for installation and removal of the feet 206, 208.

Figure 10:
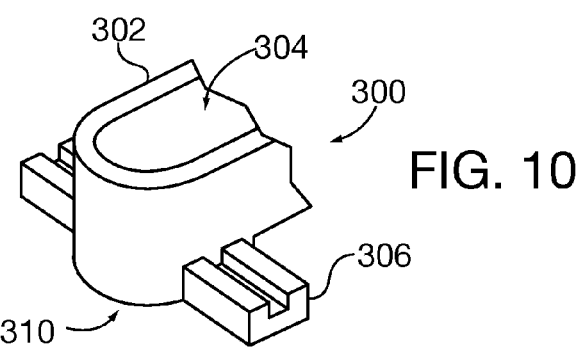
FIG. 10 is a perspective detail view of part of another stand for a bicycle, according to at least one further aspect of the invention.

FIG. 10 shows a further alternative to the folding feet 106, 112 of FIGS. 1A and 2. In FIG. 10, a stand 300 (not shown in its entirety) may comprise a trough 302 defining a primary receptacle 304. The primary receptacle 304 is upwardly open, and is preferably dimensioned and configured to receive the wheel 4 by lowering the wheel 4 into the primary receptacle 304 from above when the stand 300 is in the position of use such as that depicted in FIG. 1A. The stand 300 may have a channel 310 which is dimensioned and configured to receive a foot 306 by slide fit as the foot 306 is moved into the deployed position. Of course, the foot 306 is configured and dimensioned to be received in close fit by the channel 310.

Figure 11:
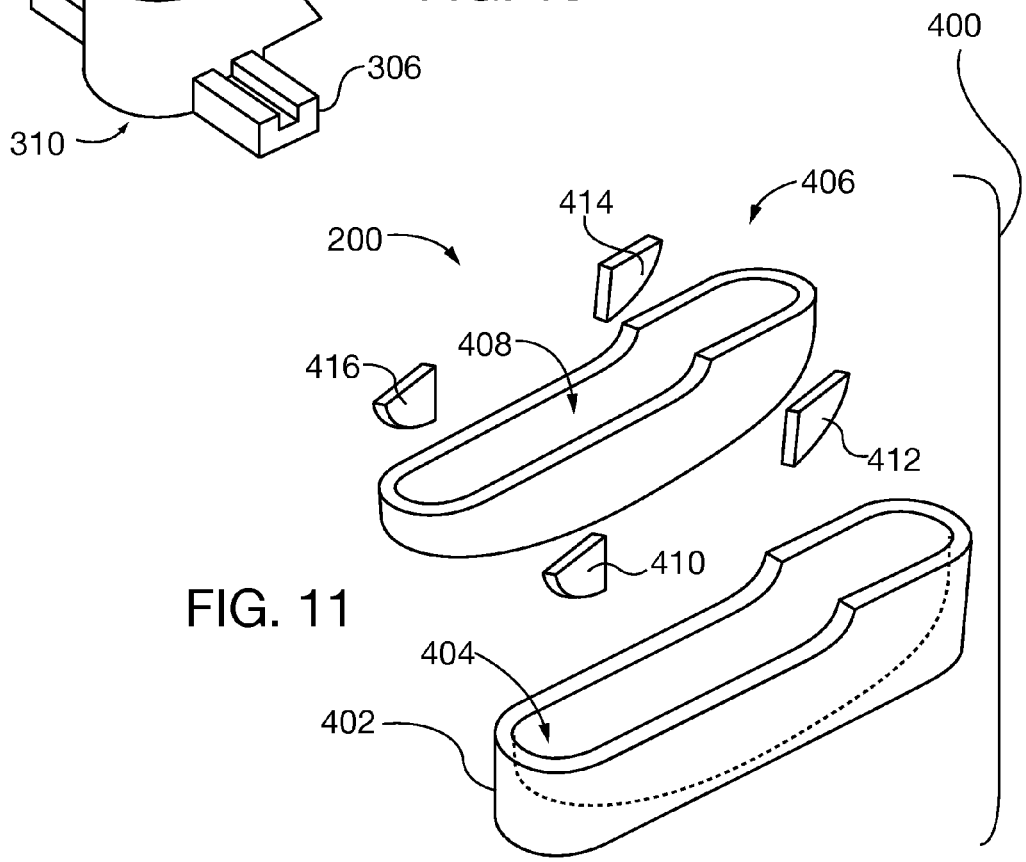
FIG. 11 is a perspective view of an optional adapting liner.

FIG. 11 shows an optional feature of the invention. A stand 400 may comprise a trough 402 defining a primary receptacle 404. The primary receptacle 404 is upwardly open, and is preferably dimensioned and configured to receive the wheel 4 by lowering the wheel 4 into the primary receptacle 404 from above when the stand 400 is in the position of use such as that depicted in FIG. 1A. The stand 400 may have feet (not shown) of any suitable type, such as those shown and described herein. The salient feature of the stand 400 is not feet, but rather an adapting liner 406 which is dimensioned and configured to be received in close cooperation within the primary receptacle 404 of the trough 400. The adapting liner 406 in turn comprises a secondary receptacle 408 of dimensions smaller than those of the primary receptacle 404 of the trough 402. The secondary receptacle 408 is dimensioned and configured to receive a second wheel (not shown) in close cooperation therewith. The second wheel may be generally similar to the first wheel 4 of FIG. 1A, but is of tire width less than that of the first wheel 4. This feature enables the stand 400 to accommodate wheels such as the wheel 4 of different nominal widths and purposes. Thus the stand 400, or any stand provided with a feature comparable to the adapting liner 406, may be used interchangeably with racing bicycles, road bicycles, and mountain bicycles, for example, by utilizing an appropriate adaptign liner such as the adapting liner 406.

The adapting liner 406 may be of external dimensions and configuration so as to be tightly and closely received within the receptacle 404 (this option is not shown). As an alternative, the external dimensions and configuration of the adapting liner 406 may be sufficiently smaller than the corresponding surface of the receptacle 404 so that a gap exists between the two. In the case of such an occurrence, the stand 400 mayi be provided with at least one, and if desired a plurality of adapters 410, 412, 414, 416 each which is dimensioned and configured to fill such a gap.

Figure 12:
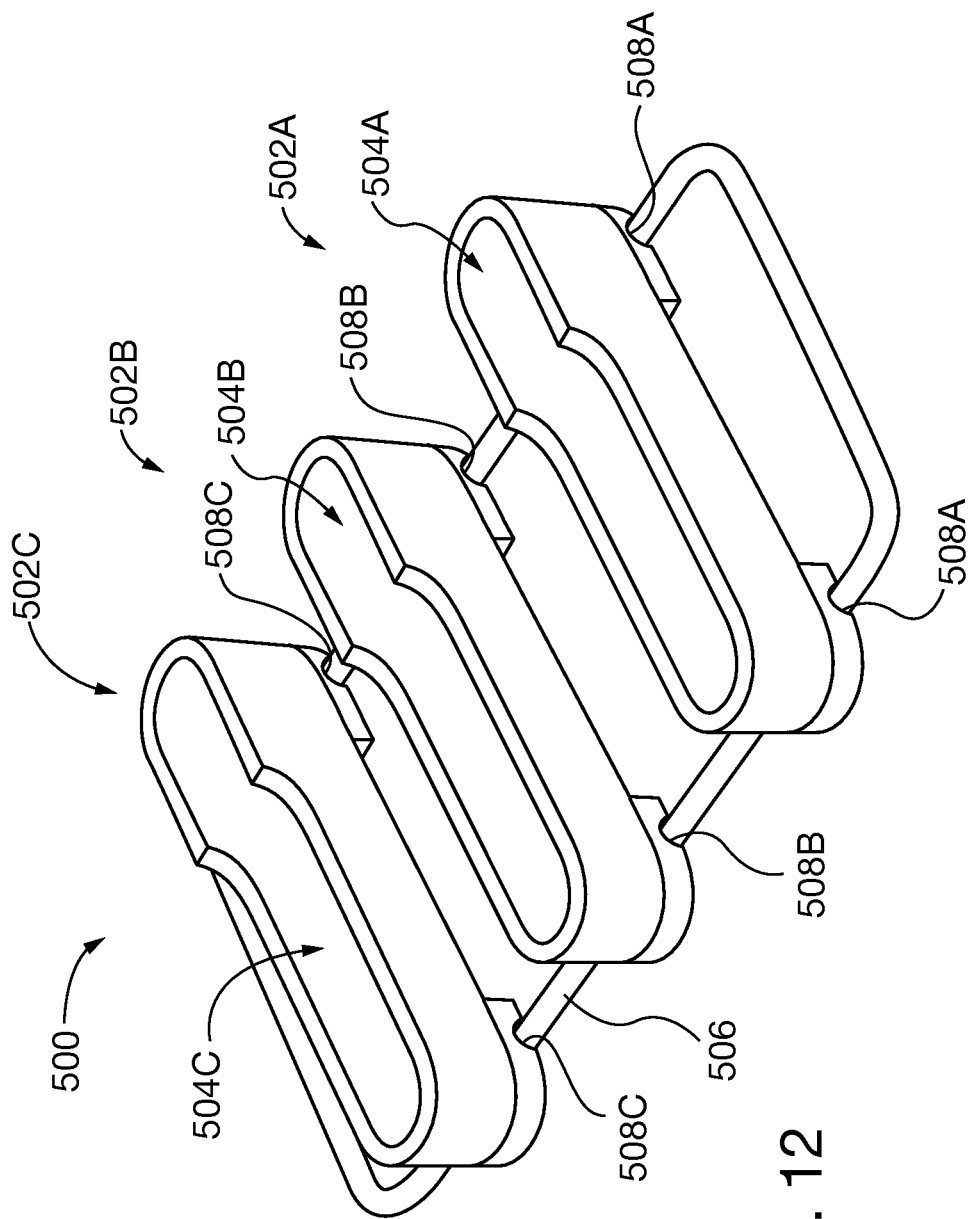
FIG. 12 is a perspective view of another embodiment of the invention with a plurality of troughs.

FIG. 12 shows a stand 500 for a plurality of bicycles (not shown). Each of the bicycles has at least one first wheel mounted thereon, such as the wheel 4 of FIG. 1B. The stand 500 comprising a plurality of troughs such as troughs 502A, 502B, 502C. Each trough 502A, 502B, 502C has a respective primary receptacle 504A, 504B, or 504C. which is dimensioned and configured to receive one wheel of one bicycle in close cooperation therewith. The stand 500 comprises a base 506 disposed to connect the troughs 502A, 502B, 502C together in a deployed position such as that seen in FIG. 1A, such that the primary receptacles 504A, 504B, 504C of the troughs 502A, 502B, 502C all open upwardly when the troughs 502A, 502B, 502C are placed on a horizontal surface such as the horizontal surface 2. The troughs 502A, 502B, 502C are stabilized against spontaneous tumbling of bicycles supported by placing one first wheel of each bicycle in one primary receptacle 504A, 504B, 504C of their respective troughs 502A, 502B, 502C. The base 506 may comprise a closed loop of tubes which engages channels 508A, 508B, 508C formed in the bottom surfaces of the troughs 502A, 502B, 502C. Engagement of the channels 508A, 508B, 508C may be frictional, or alternatively, may comprise a threaded fastener (not shown) or other fastener for reinforcing securement of the troughs 502A, 502B, 502C. Preferably, connection using friction or a fastener enables manual attachment to and removal of the base 506 from the troughs 502A, 502B, 502C. As seen, the base 506 may connect the troughs 502A, 502B, 502C together such that the troughs 502A, 502B, 502C are disposed abreast of and parallel to one another. Connection may rely upon a threaded fastener arrangement similar to that seen in FIG. 9 for example.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible

I claim:

1. A stand for a bicycle having at least one first wheel mounted thereon, the stand comprising a trough having a primary receptacle which is dimensioned and configured to receive the first wheel in cooperation therewith, and at least one stabilizing folding foot assembly which is manually movable between a stowed position and a deployed position relative to the trough, and which in the deployed position the folding foot assembly is fixed to and projects laterally from the trough in a direction generally parallel to the axle of the first wheel, wherein the foot assembly comprises two feet, each with an upper and lower face and a hinge disposed to hold the two feet together, such that when the foot assembly is in the deployed position, the lower faces of the feet are adapted to be disposed on a surface on which the stand rests, and the first wheel of the bicycle is located within the trough, and when the foot assembly is in the stowed position, the two feet can be pivoted about the hinge such that the upper faces are adjacent and face one another and the foot assembly can be disposed such that the feet are contained at least partially within the trough.

2. The stand of claim 1, wherein the trough comprises a channel disposed to receive the stabilizing foot by slide fit in the deployed position.

3. The stand of claim 1, wherein the folding foot assembly further comprises an axle pivotally mounted to the trough and disposed to pivot between the stowed position, wherein the feet are contained at least partially within the primary receptacle of the trough, and a deployed position wherein the feet are external to the trough.

* * * * *